United States Patent
Sawa et al.

(10) Patent No.: US 9,387,774 B2
(45) Date of Patent: Jul. 12, 2016

(54) TRAIN-INFORMATION MANAGEMENT DEVICE AND DEVICE CONTROL METHOD

(75) Inventors: Takuya Sawa, Tokyo (JP); Tomoaki Ikejima, Tokyo (JP); Tetsuo Komura, Tokyo (JP); Shogo Tatsumi, Tokyo (JP); Shingo Honda, Tokyo (JP); Toshiko Kadono, Tokyo (JP); Takashi Miyauchi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/417,997

(22) PCT Filed: Aug. 14, 2012

(86) PCT No.: PCT/JP2012/070698
§ 371 (c)(1),
(2), (4) Date: Jan. 28, 2015

(87) PCT Pub. No.: WO2014/027400
PCT Pub. Date: Feb. 20, 2014

(65) Prior Publication Data
US 2015/0165930 A1 Jun. 18, 2015

(51) Int. Cl.
G01D 1/00 (2006.01)
G01D 3/00 (2006.01)
G06F 7/00 (2006.01)
(Continued)

(52) U.S. Cl.
CPC ............. *B60L 15/2009* (2013.01); *B60L 1/003* (2013.01); *B60L 7/10* (2013.01); *B60L 7/14* (2013.01); *B60L 7/18* (2013.01); *B60L 9/22* (2013.01); *B60L 15/002* (2013.01); *B60L 15/2045* (2013.01); *B60T 1/10* (2013.01); *B60T 8/17* (2013.01); *B60T 13/665* (2013.01); *B60T 17/228* (2013.01); *F16D 61/00* (2013.01); *B60L 2200/26* (2013.01); *B60T 2270/60* (2013.01);
(Continued)

(58) Field of Classification Search
CPC combination set(s) only.
See application file for complete search history.

(56) References Cited

FOREIGN PATENT DOCUMENTS

JP 58-089005 A 5/1983
JP 1-270703 A 10/1989
(Continued)

OTHER PUBLICATIONS

International Search Report (PCT/ISA/210) mailed on Sep. 18, 2012, by the Japanese Patent Office as the International Searching Authority for International Application No. PCT/JP2012/070698.
(Continued)

*Primary Examiner* — Bhavesh V Amin
(74) *Attorney, Agent, or Firm* — Buchanan Ingersoll & Rooney PC

(57) ABSTRACT

The train-information management device includes a position detection unit; a regenerating-condition detection unit that detects a regenerative-brake usage condition; a train-line-information holding unit that holds therein information on a section in which a train is more likely to use a brake; a residual-air-amount calculation unit that calculates the amount of residual air in an air tank; and a compressor control unit that controls a compressor. In a regeneration-preparation condition, if a train is running through a position where the distance between the position and a section in which a train is more likely to use a brake is equal to or less than a given value, if the train does not use a regenerative brake, and if the amount of residual air reaches 0%, the compressor control unit causes a compressor to start generating compressed air.

4 Claims, 5 Drawing Sheets

(51) Int. Cl.
*G06F 17/00* (2006.01)
*B60L 15/20* (2006.01)
*B60T 8/17* (2006.01)
*B60L 7/14* (2006.01)
*B60L 1/00* (2006.01)
*B60L 7/18* (2006.01)
*B60L 9/22* (2006.01)
*B60L 15/00* (2006.01)
*B60T 1/10* (2006.01)
*B60T 13/66* (2006.01)
*B60T 17/22* (2006.01)
*F16D 61/00* (2006.01)
*B60L 7/10* (2006.01)

(52) U.S. Cl.
CPC ............. *Y02T10/645* (2013.01); *Y02T 10/72* (2013.01); *Y02T 10/7283* (2013.01)

(56) References Cited

FOREIGN PATENT DOCUMENTS

| | | |
|---|---|---|
| JP | 2-085057 A | 3/1990 |
| JP | 2000-198444 A | 7/2000 |
| JP | 2001-030903 A | 2/2001 |
| JP | 2001-204102 A | 7/2001 |
| JP | 2004-225742 A | 8/2004 |
| JP | 2009-119963 A | 6/2009 |
| JP | 2009-183079 A | 8/2009 |
| JP | 2009-225630 A | 10/2009 |

OTHER PUBLICATIONS

Written Opinion (PCT/ISA/237) mailed on Sep. 18, 2012, by the Japanese Patent Office as the International Searching Authority for International Application No. PCT/JP2012/070698.

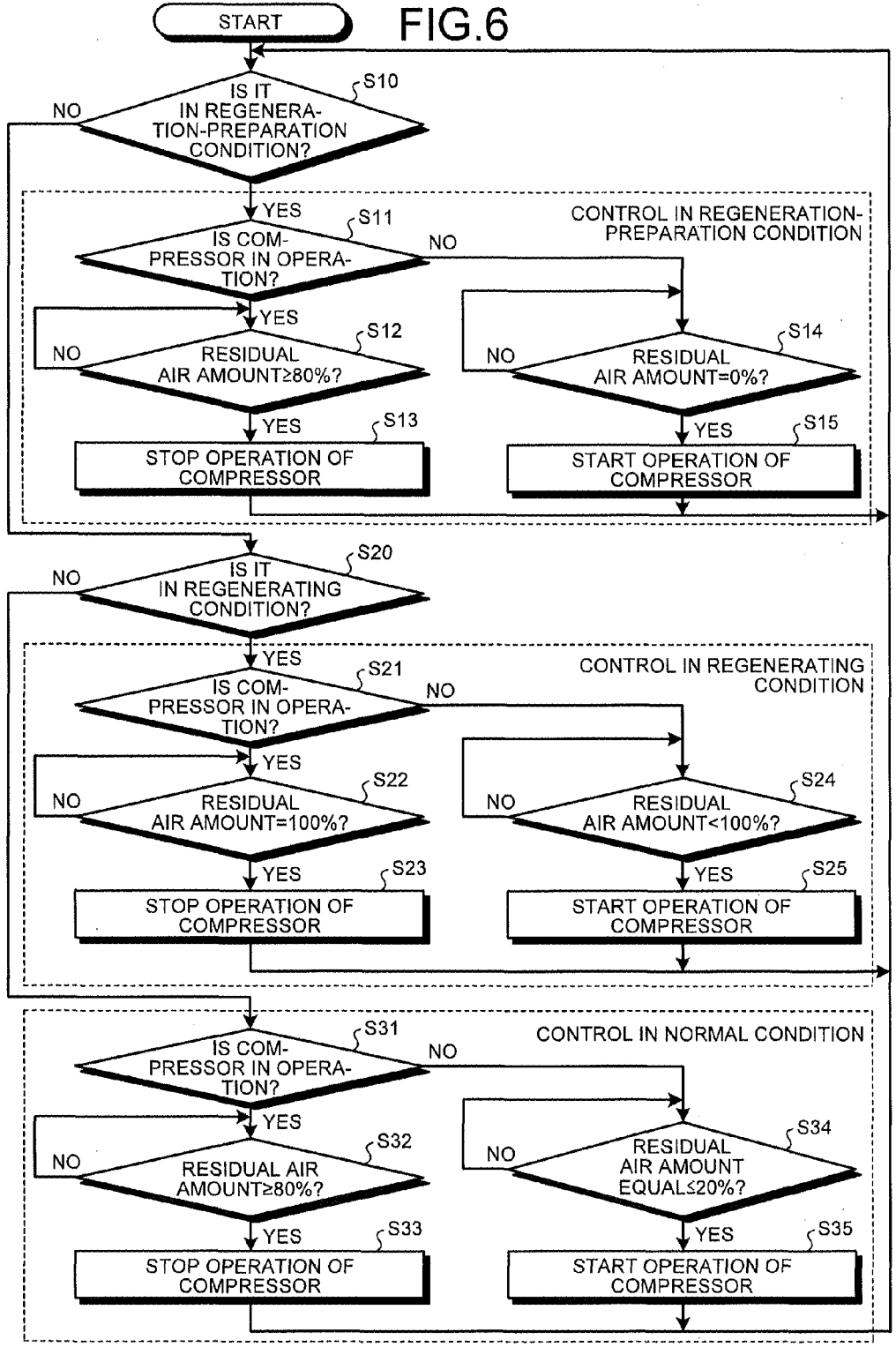

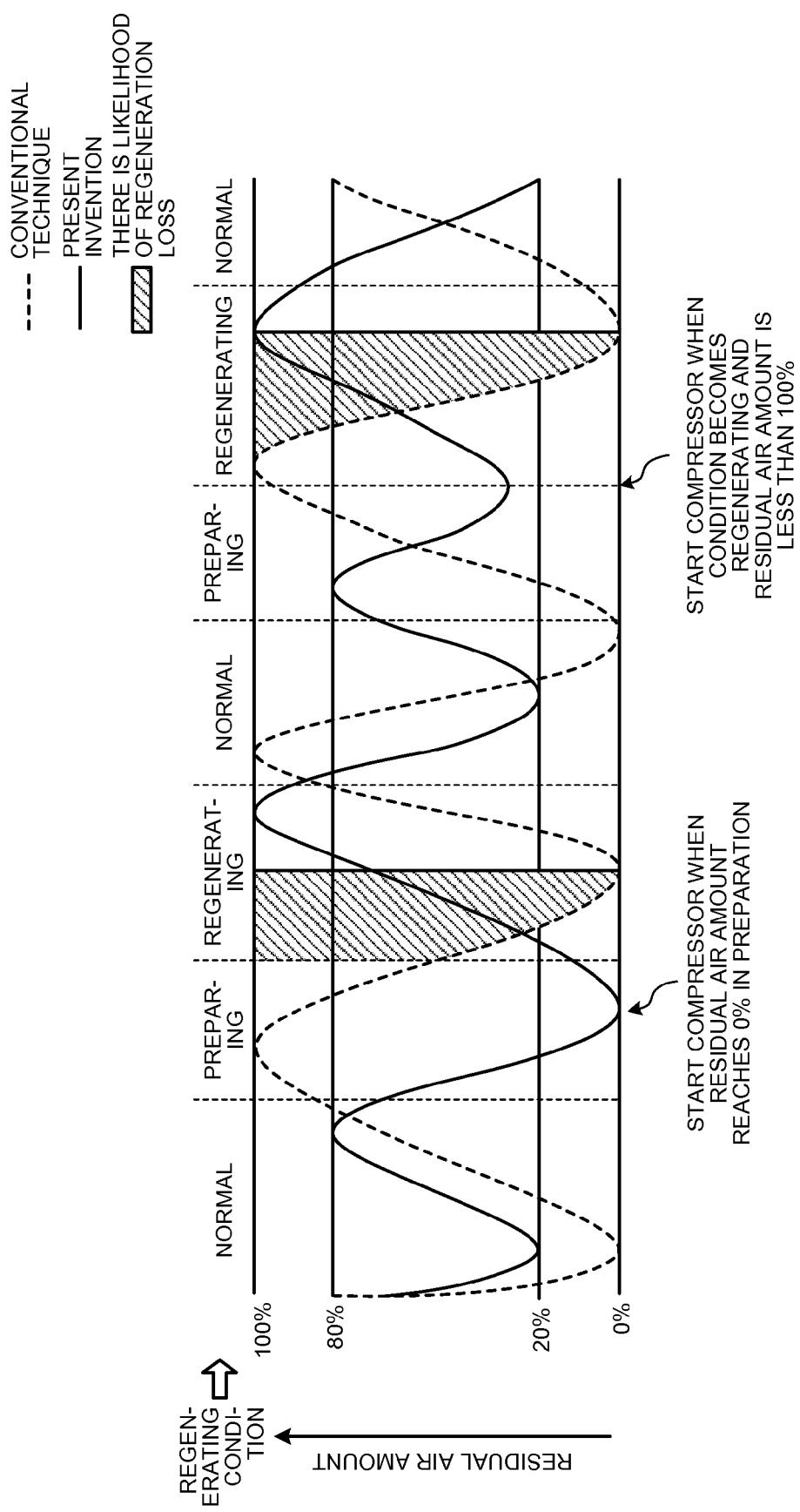

TRAIN-INFORMATION MANAGEMENT DEVICE AND DEVICE CONTROL METHOD

FIELD

The present invention relates to a train-information management device and, more particularly, relates to a train management device that efficiently uses regenerated power generated when an electrical brake is used.

BACKGROUND

A train-information management device collects and manages data regarding the conditions of various devices provided on each vehicle of a train, and it can then control the individual devices on the basis of the collected condition data. Control target devices are power converters that convert electric power supplied from an overhead wire and then supply the converted power to the main electric motors and to auxiliary devices, and devices such as air conditioners, lighting devices, and braking devices.

In recent years, trains have generally included a regenerative brake that brakes by using a main electric motor and then returns electric power generated during the braking back to the overhead wire so as to be used by other trains. The regenerative brake has a problem in that when there are no other trains or the like that consume electric power in the vicinity of the braking train, the electric power cannot be returned to the overhead wire, which causes regeneration reduction or regeneration loss, and thus electric power generated by the regenerative brake cannot be effectively used. In order to solve the problem as described above, in the invention described in Patent Literature 1 listed below, when effective regenerative braking is lost, the pressure in a main air reservoir of an air brake is checked and if the pressure is lower than an appropriate value, an electrical brake (a regenerative brake) is operated in order to use electric power generated by the electrical brake to operate a compressor, thereby achieving effective utilization of the regenerated power.

CITATION LIST

Patent Literature

Patent Literature 1: Japanese Patent Application Laid-open No. 2009-119963

SUMMARY

Technical Problem

However, in the above conventional technique, electric power can be used only when the low pressure in the main air reservoir coincides with the regeneration loss. This results in a problem in that the regenerated power cannot be effectively used.

The present invention has been made to solve the above problems, and an objective of the present invention is to provide a train-information management device and a device control method that reduces the probability of the regeneration being lost by controlling a device provided on a vehicle so as to be able to effectively use the regenerated power.

Solution to Problem

To solve the problem described above and achieve the objective, the present invention relates to a train-information management device that is provided on a train, that manages information on devices provided in a vehicle, and that controls each of the devices. The train-information management device includes: a position detection unit that detects a position of the train; a regenerating-condition detection unit that detects whether the train is in a condition of using a regenerative brake; a train-line-information holding unit that holds therein information on a section in which a train is more likely to use a brake; a residual-air-amount calculation unit that calculates an amount of residual air in an air tank that stores compressed air therein to be used for an air brake; and a compressor control unit that controls a compressor that generates the compressed air on the basis of a detection result obtained by the position detection unit, a detection result obtained by the regenerating-condition detection unit, information held in the train-line-information holding unit, and a calculation result obtained by the residual-air-amount calculation unit. In a regeneration-preparation condition where a train is running through a position at which a distance between the position and a section in which a train is more likely to use a brake is equal to or less than a given value and is running toward the section, and where a train does not use a regenerative brake when the amount of residual air reaches 0%, the compressor control unit causes the compressor to start generating compressed air, in a regenerating condition where the train uses a regenerative brake, when the amount of residual air is less than 100%, the compressor control unit causes the compressor to generate compressed air, and in a normal condition that corresponds neither to the regeneration-preparation condition nor to the regenerating condition, when the amount of residual air reaches a first threshold value that is greater than 0%, the compressor control unit causes the compressor to start generating compressed air, and when the amount of residual air reaches a second threshold value that is greater than the first threshold value and less than 100%, the compressor control unit causes the compressor to finish generating compressed air.

Advantageous Effects of Invention

According to the present invention, the electric power used inside the train, which is generated when a regenerative brake is used, increases, and therefore the amount of electric power to be returned to an overhead wire can be reduced. As a result, in a case where trains in the vicinity thereof and the like need only a small amount of electric power, the loss of regeneration can be reduced and the regenerated power can be more effectively used.

BRIEF DESCRIPTION OF DRAWINGS

FIG. 6 is a flowchart illustrating an example of an operation of the compressor-controlling function unit.

FIG. 7 illustrates an example of variations in the amount of residual air in the air tank.

DESCRIPTION OF EMBODIMENTS

Exemplary embodiments of a train-information management device and a device control method according to the present invention will be described below in detail with reference to the accompanying drawings. The present invention is not limited to the embodiments.

First Embodiment

Figure 1:
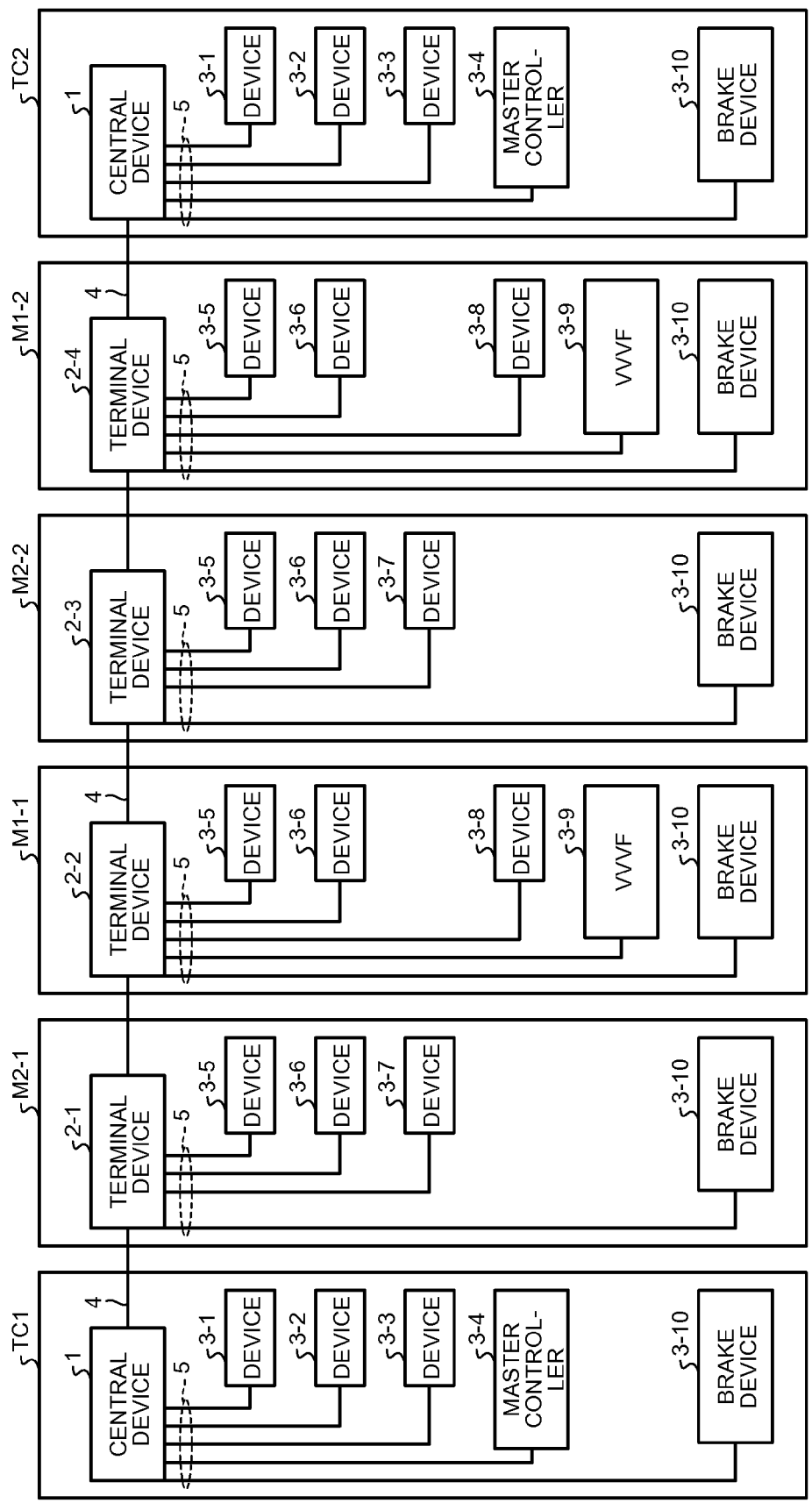
FIG. 1 illustrates an example of a formation of a train on which a train-information management device is mounted.

FIG. 1 illustrates an example of a formation of a train on which a train-information management device according to an embodiment of the present invention is mounted. In FIG. 1, the train formation includes six vehicles, for example, and its specific configuration is made up of vehicles TC1, M2-1, M1-1, M2-2, M1-2, and TC2.

A central device 1 of the train-information management device (hereinafter, simply referred to as "central device") is provided on each of the vehicles TC1 and TC2, which are provided at opposite ends of the formation, respectively. On the vehicles M2-1, M1-1, M2-2, and M1-2, which are provided in the middle of the formation, terminal devices 2-1, 2-2, 2-3, and 2-4 of the train-information management device (hereinafter, simply referred to as "terminal devices") are provided, respectively. The train-information management device according to the present embodiment includes the central devices 1 and the terminal devices 2-1 to 2-4. When the train runs, one of the vehicles TC1 and TC2 is the leading vehicle, and the other vehicle is the tail vehicle. The central devices 1 and the terminal devices 2-1 to 2-4 are connected through a trunk transmission path (a transmission path between vehicles) 4 provided across the vehicles, so as to be capable of communicating with each other.

The vehicle TC1 includes the central device 1; devices 3-1 to 3-3 that are connected to the central device 1, each through branch transmission paths (transmission paths within a vehicle) 5; a master controller 3-4 that is connected to the central device 1 through the branch transmission path 5; and a brake device 3-10 that is connected to the central device 1 through the branch transmission path 5. The branch transmission paths 5 are communication paths each provided within a vehicle. The devices 3-1 to 3-3 are, for example, air conditioners. The central device 1 transmits control information for controlling each of the devices 3-1 to 3-3 and the brake device 3-10 and obtains device information (condition data) from each of the devices 3-1 to 3-3 and the brake device 3-10. The master controller 3-4 is controlled and managed by the central device 1 in the same manner as the devices 3-1 to 3-3. The master controller 3-4 transmits control information to the central device 1, such as accelerating notch information (acceleration information) or brake notch information (deceleration information) that is input from the motorman's cab (not illustrated).

The vehicle M2-1 includes the terminal device 2-1, devices 3-5 to 3-7 that are connected to the terminal device 2-1 respectively through the branch transmission paths 5, and the brake device 3-10 that is connected to the terminal device 2-1 through the branch transmission path 5. The devices 3-5 to 3-7 are, for example, air conditioners. The terminal device 2-1 transmits control information for controlling the devices 3-5 to 3-7 and the brake device 3-10 and obtains device information (condition data) from the devices 3-5 to 3-7 and the brake device 3-10.

The vehicle M1-1 includes the terminal device 2-2; devices 3-5, 3-6, and 3-8 that are connected to the terminal device 2-2 respectively through the branch transmission paths 5; a VVVF 3-9 that is connected to the terminal device 2-2 through the branch transmission path 5; and the brake device 3-10 that is connected to the terminal device 2-2 through the branch transmission path 5. The brake device 3-10 is an air brake. The devices 3-5, 3-6, and 3-8 are air conditioners, for example. The VVVF 3-9 is a variable voltage variable frequency (VVVF) inverter, for example, and controls the driving of a vehicle by varying the voltage and the frequency of a motor (not illustrated). The terminal device 2-2 transmits control information for controlling the devices 3-5, 3-6, and 3-8, the VVVF 3-9, and the brake device 3-10; and obtains device information (condition data) from the devices 3-5, 3-6, and 3-8, the VVVF 3-9, and the brake device 3-10.

The vehicle TC2 has the same configuration as the vehicle TC1. The vehicle M2-2 has the same configuration as the vehicle M2-1. The terminal device 2-3 has the same function as the terminal device 2-1. The vehicle M1-2 has the same configuration as the vehicle M1-1. The terminal device 2-4 has the same function as the terminal device 2-2.

Figure 2:
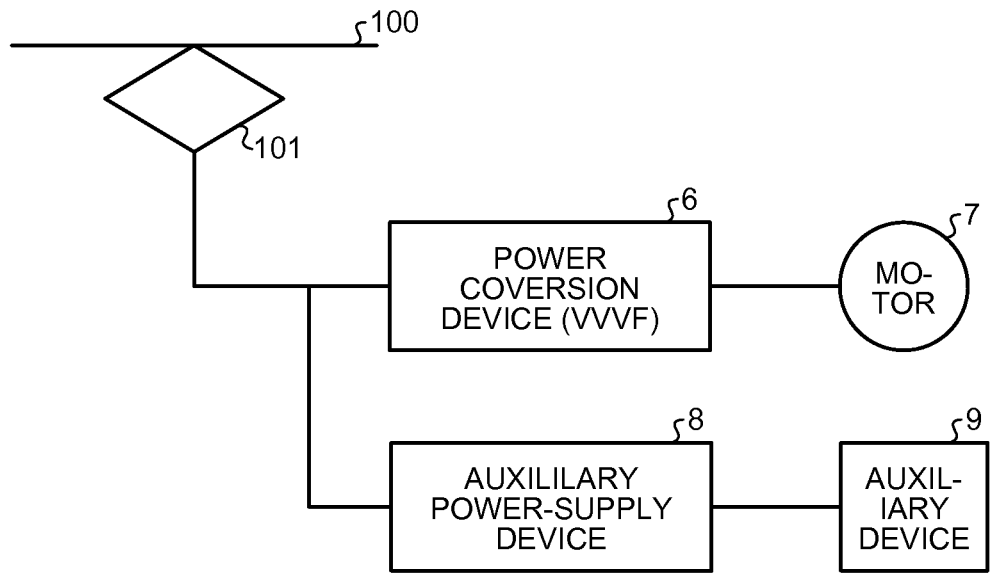
FIG. 2 illustrates an example of the connection of a power conversion device.

Although illustrations thereof are partially omitted from FIG. 1, a predetermined vehicle of the train includes a power conversion device 6 and an auxiliary power-supply device 8, both illustrated in FIG. 2, to convert electric power obtained from an overhead wire 100 by a power collector 101 so as to generate the drive power for a motor 7 and an auxiliary device 9. The power conversion device 6 corresponds to the VVVF 3-9 illustrated in FIG. 1. The power conversion device 6 and the motor 7 operate as a regenerative brake when a train is decelerated. The auxiliary power-supply device 8 normally converts electric power supplied from the overhead wire 100 to generate drive power for the auxiliary device 9. However, when a regenerative brake is used and thus power generation occurs, the auxiliary power-supply device 8 uses a part or all of the electric power (regenerated power) that is returned from the power conversion device 6 to the overhead wire 100 so as to generate the drive power for the auxiliary device 9.

Figure 3:
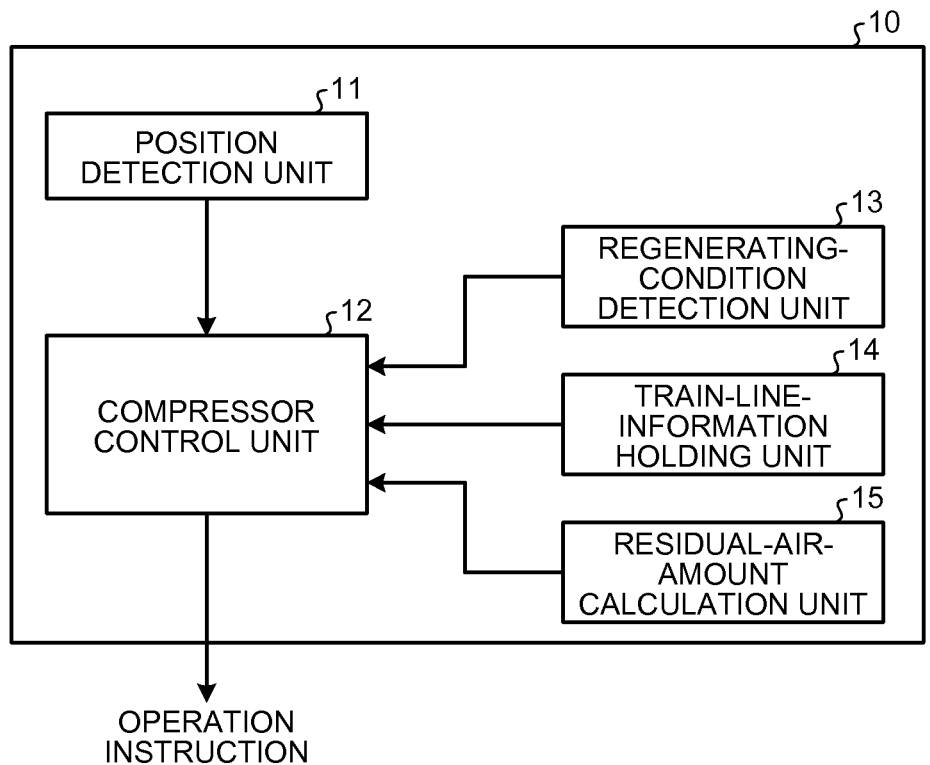
FIG. 3 illustrates an example of the configuration of a compressor-controlling function unit.

FIG. 3 illustrates an example of the configuration of a compressor-controlling function unit 10 that is included in the train-information management device according to the present embodiment. The compressor-controlling function unit 10 is provided, for example, within the central device 1. The compressor-controlling function unit 10 instructs a compressor to start and finish generating compressed air. The compressor generates compressed air to be stored in an air tank (a main air reservoir), with the air tank and the brake device 3-10 constituting an air brake system.

As illustrated, the compressor-controlling function unit 10 includes a position detection unit 11, a compressor control unit 12, a regenerating-condition detection unit 13, a train-line-information holding unit 14, and a residual-air-amount calculation unit 15.

The position detection unit 11 utilizes a detector on a vehicle, a detector on the ground, and a tacho-generator (all not illustrated), for example, so as to detect the position of the train running on a railway. The position can be detected by using other methods. The compressor control unit 12 controls the compressor that generates compressed air to be stored in the air tank included in the air brake device (the brake device 3-10).

Figure 4:
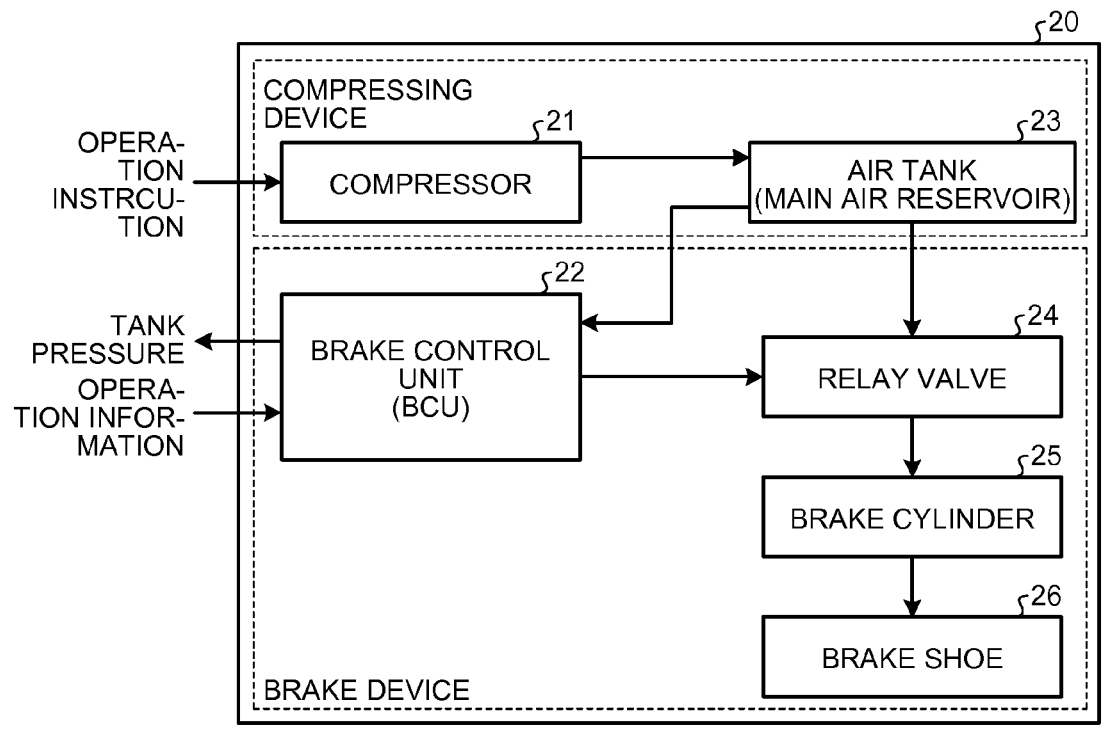
FIG. 4 illustrates an example of the configuration of an air brake system.

The brake device 3-10 is described below. FIG. 4 illustrates an example of the configuration of the air brake system including the brake device 3-10. An air brake system 20 includes a compressor 21, a brake control unit (BCU) 22, an air tank (a main air reservoir) 23, a relay valve 24, a brake cylinder 25, and a brake shoe 26. The brake control unit 22, the relay valve 24, the brake cylinder 25, and the brake shoe 26 constitute the brake device 3-10. The brake device 3-10 is used in a condition where a regenerative brake cannot be used or in a condition where the necessary brake force cannot be obtained only from a regenerative brake. The compressor 21 and the air tank 23 constitute a compressing device. As illustrated in FIG. 1, the brake device 3-10 (the brake control unit 22, the relay valve 24, the brake cylinder 25, and the brake shoe 26) is provided on all the vehicles. However, the compressing device (the compressor 21 and the air tank 23) is provided only on some of the vehicles (for example, the vehicles M2-1 and M2-2). Note that the compressing device is not limited to being provided on any specific vehicle. The compressing device can be provided on all the vehicles.

The compressor 21 operates according to instructions from the compressor-controlling function unit 10, and delivers air to the air tank 23. The air tank 23 stores therein compressed air generated by the compressor 21. The brake control unit 22 controls a relay valve 24 on the basis of operational information that designates an operation of the air brake device, such as a motorman's brake operational status, and adjusts the output amount (including "0") of the compressed air stored in the air tank 23 to the brake cylinder 25. The brake control unit 22 detects the pressure in the air tank 23 (the pressure of compressed air stored therein), and it outputs the detection result as tank pressure. By using the compressed air that is output from the air tank 23, the brake cylinder 25 generates a predetermined brake-cylinder pressure, thereby pressurizing the brake shoe 26. The brake shoe 26 is pressed against a wheel with a strength that is in accordance with the brake-cylinder pressure and the train decelerates. While only the brake control unit 22 in a vehicle with the compressing device provided thereto outputs the tank pressure, the brake control unit 22 in a vehicle without the compressing device does not output the tank pressure.

Returning to the descriptions of the compressor-controlling function unit 10, the regenerating-condition detection unit 13 monitors an operating condition of the power conversion device 6 (see FIG. 2), and it determines whether the power conversion device 6 and the motor 7 are operating as a regenerative brake (whether the operating condition is a regenerating condition). For example, a bit indicating whether the power conversion device 6 is in a regenerating condition is output to the regenerating-condition detection unit 13, and the regenerating-condition detection unit 13 confirms the condition of this bit to determine the operating condition. The regenerating-condition detection unit 13 can be configured to monitor the motorman's operation result, and it can determine that the operating condition is in a regenerating condition when the motorman operates the brakes.

The train-line-information holding unit 14 holds therein information regarding a railway line on which the train is running, and it specifically holds information on a section in which the train is more likely to use a brake such as a regenerative brake. Examples of such sections include a final section approaching a station, a downward-slope section, a speed-reducing section, and a temporary speed-limit section. An example of the information is the distance in kilometers between both ends of the section. Information that is more likely to be updated, such as information on the temporary speed-limit section, can be obtained from a system on the ground side by using a wireless communication device (not illustrated), and can be stored, each time the information is updated, in the train-line-information holding unit 14.

Figure 5:
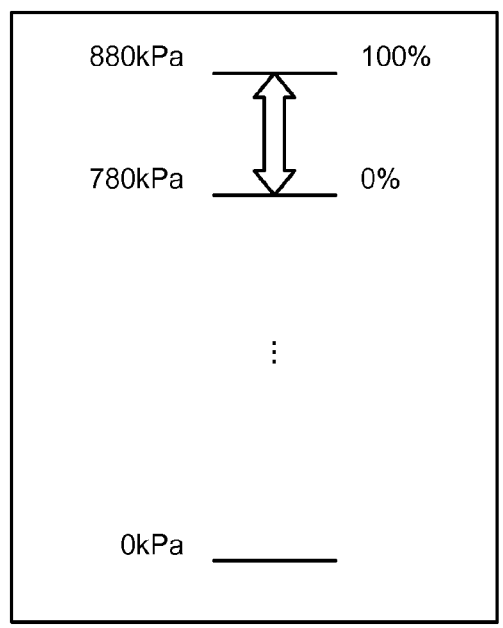
FIG. 5 illustrates an example of the correspondence between the pressure and the amount of residual air in an air tank.

The residual-air-amount calculation unit 15 calculates the amount of residual air that corresponds to the pressure of the compressed air stored in the air tank 23 in the air brake system 20. That is, the residual-air-amount calculation unit 15 calculates the amount of residual air on the basis of the tank pressure that is output from the brake control device 22 in a vehicle with the compressing device provided thereon. When the amount of residual air is 100%, the pressure of compressed air is equal to the maximum pressure withstandable by the air tank. When the amount of residual air is 0%, the pressure of compressed air is equal to the minimum pressure to obtain a brake force (the lower-limit pressure value for a brake device to be capable of operating). For example, as illustrated in FIG. 5, when the pressure is 880 kPa, the amount of residual air is 100%, and when the pressure is 780 kPa, the amount of residual air is 0%.

Next, a detailed operation of the compressor-controlling function unit 10 in the train-information management device according to the present embodiment is described with reference to FIG. 6. For the sake of simplicity, an example in which the compressor-controlling function unit 10 controls one compressor is described.

The compressor-controlling function unit 10 determines which condition the train provided therewith is in among a regeneration-preparation condition, a regenerating condition, and a normal condition. Depending on the condition, the compressor-controlling function unit 10 executes a different control on the compressor 21 in the air brake system 20. The "regeneration-preparation condition" refers to a condition in which a train is passing through a position where a train is more likely to use a regenerative brake after a short time, i.e., a condition where a train is passing through a position where the distance to a section in which a train is more likely to use a regenerative brake is equal to or less than a given value, and the train is approaching the section. The "regenerating condition" refers to a condition where a train is operating a regenerative brake and a motor is generating power. The "normal condition" refers to a condition other than the above conditions.

A specific operation of the compressor-controlling function unit 10 is described below. First, on the basis of the detection result obtained by the position detection unit 11, the detection result obtained by the regenerating-condition detection unit 13, and the train-line information held in the train-line-information holding unit 14, the compressor-controlling function unit 10 determines which of the regeneration-preparation condition, the regenerating condition, and the normal condition, the train is in (Steps S10 and S20). Specifically, when the train is running toward a section in which a train is more likely to use a regenerative brake; when the distance between the current position (the current position indicated by the detection result obtained by the position detection unit 11) and the section in which a train is more likely to use a regenerative brake is equal to or less than a given value; and when the power conversion device 6 and the motor 7 do not operate as a regenerative brake, then the compressor-controlling function unit 10 determines the train is in the regeneration-preparation condition. When the power conversion device 6 and the motor 7 operate as a regenerative brake, the compressor-controlling function unit 10 determines the train is in the regenerating condition. Aside from these determinations, the compressor-controlling function unit 10 determines the train is in the normal condition.

When the train is in the regeneration-preparation condition (YES at Step S10), the compressor-controlling function unit 10 executes the control by following Steps S11 to S15.

That is, the compressor-controlling function unit 10 confirms whether the compressor 21 is in operation (Step S11). When the compressor 21 is in operation (YES at Step S11), the compressor-controlling function unit 10 confirms whether the amount of residual air in the air tank 23 (hereinafter, simply referred to as "amount of residual air") is equal to or greater than 80% (Step S12). When the amount of residual air is less than 80%, the operation of the compressor 21 is continued until the amount of residual air reaches 80% or greater (NO at Step S12). When the amount of residual air is equal to or greater than 80% (YES at Step S12), the compressor-controlling function unit 10 instructs the compressor 21 to stop operating (Step S13). Thereafter, the operation of the compressor-controlling function unit 10 shifts back to Step S10 and continues to follow the flowchart.

Meanwhile, when the compressor 21 is being stopped (NO at Step S11), the compressor-controlling function unit 10 confirms whether the amount of residual air is equal to 0% (Step S14). When the amount of residual air is not equal to 0%, the stopping condition of the compressor 21 is maintained until the amount of residual air reaches 0% (NO at Step S14). When the amount of residual air is equal to 0% (YES at Step S14), the compressor-controlling function unit 10 instructs the compressor 21 to start operating (Step S15). Thereafter, the operation of the compressor-controlling function unit 10 shifts back to Step S10 and continues to follow the flowchart.

As described above, in the regeneration-preparation condition, the amount of residual air is controlled so as to be within 0% to 80%. By setting the upper limit of the amount of residual air to 80%, the compressor 21 is reliably operated in the regenerating condition described later, such that a large amount of electric power can be consumed by the train. By setting the lower limit of the amount of residual air to 0%, the time, at which the compressor 21 starts operating before changing to the regenerating condition, is set as late as possible, such that the compressor 21 can operate for a longer duration in the regenerating condition. As a result, in the regenerating condition, a larger amount of electric power can be consumed by the train.

At Step S10 described above, the determination of whether the train is in the regeneration-preparation condition is performed on the basis of the current position and the train-line information on the train. However, in addition to these pieces of information, the determination can also be performed in consideration of the speed of the train. For example, when the train is running at a high speed, the time (or, the position on a train line) for determining the train to be in the regeneration-preparation condition is set earlier. Also, when the train is running at a low speed, the time for determining the train to be in the regeneration-preparation condition is set later. By adjusting the determination time according to the train speed, the compressor-controlling function unit 10 can start performing control in the regeneration-preparation condition at a more appropriate time. As a result, the frequency with which the compressor 21 starts operating in the regeneration-preparation condition is reduced, and therefore a large amount of electric power can be consumed in the regenerating condition.

When the train is in the regenerating condition (NO at Step S10, and YES at Step S20), the compressor-controlling function unit 10 executes following control Steps S21 to S25.

That is, the compressor-controlling function unit 10 confirms whether the compressor 21 is in operation (Step S21). When the compressor 21 is in operation (YES at Step S21), the compressor-controlling function unit 10 confirms whether the amount of residual air is equal to 100% (Step S22). When the amount of residual air is not equal to 100%, the operation of the compressor 21 is continued until the amount of residual air reaches 100% (NO at Step S22). When the amount of residual air is equal to 100% (YES at Step S22), the compressor-controlling function unit 10 instructs the compressor 21 to stop operating (Step S23). Thereafter, the operation of the compressor-controlling function unit 10 shifts back to Step S10 and continues to follow the flowchart.

Meanwhile, when the compressor 21 is being stopped (NO at Step S21), the compressor-controlling function unit 10 confirms whether the amount of residual air is less than 100% (Step S24). When the amount of residual air is not less than 100%, the stopping condition of the compressor 21 is maintained until the amount of residual air becomes less than 100% (NO at Step S24). When the amount of residual air is less than 100% (YES at Step S24), the compressor-controlling function unit 10 instructs the compressor 21 to start operating (Step S25). Thereafter, the operation of the compressor-controlling function unit 10 shifts back to Step S10 and continues to follow the flowchart.

As described above, in the regenerating condition, when the amount of residual air is not equal to 100%, the compressor-controlling function unit 10 controls the compressor 21 so as to operate. Therefore, the operation time of the compressor 21 can be maximized, and a larger portion of the electric power generated by operating the regenerative brake can be consumed by the train. Further, by executing the control in the regeneration-preparation condition already described, a larger amount of electric power can be consumed by the train provided with the device in the regenerating condition. Accordingly, executing the above control in the regeneration-preparation condition and the above control in the regenerating condition reduces the likelihood of the occurrence of regeneration loss, and thus regenerated power can be effectively used.

When the train is in the normal condition (NO at Step S10, and NO at Step S20), the compressor-controlling function unit 10 executes control by following Steps S31 to S35.

Specifically, the compressor-controlling function unit 10 confirms whether the compressor 21 is in operation (Step S31). When the compressor 21 is in operation (YES at Step S31), the compressor-controlling function unit 10 confirms whether the amount of residual air is equal to or greater than 80% (Step S32). When the amount of residual air is not equal to or greater than 80%, the operation of the compressor 21 is continued until the amount of residual air reaches 80% or greater (NO at Step S32). When the amount of residual air is equal to or greater than 80% (YES at Step S32), the compressor-controlling function unit 10 instructs the compressor 21 to stop operating (Step S33). Thereafter, the operation of the compressor-controlling function unit 10 shifts back to Step S10 and continues to follow the flowchart.

Meanwhile, when the compressor 21 is being stopped (NO at Step S31), the compressor-controlling function unit 10 confirms whether the amount of residual air is equal to or less than 20% (Step S34). When the amount of residual air is not equal to or less than 20%, the stopping condition of the compressor 21 is maintained until the amount of residual air reaches 20% or less (NO at Step S34). When the amount of residual air is equal to or less than 20% (YES at Step S34), the compressor-controlling function unit 10 instructs the compressor 21 to start operating (Step S35). Thereafter, the operation of the compressor-controlling function unit 10 shifts back to Step S10 and continues to follow the flowchart.

The lower-limit and upper-limit threshold values (20% and 80%) of the amount of residual air are merely an example and can be set to different values.

In the present embodiment, a case has been described where one compressor-controlling function unit 10 controls one compressor 21. However, the compressor-controlling function unit 10 can control two or more compressors 21. In this case, the residual-air-amount calculation unit 15 in the compressor-controlling function unit 10 calculates each of the individual amounts of residual air in the air tanks 23 provided respectively in the air brake systems 20. Also, on the basis of the amounts of residual air in each of the air tanks 23, the compressor control unit 12 controls the operation of each of the compressors 21. When a plurality of air brake systems 20 are provided on one train formation, equal number of compressor-controlling function units 10 can be provided to the air brake systems 20; and one compressor-controlling function unit 10 can be configured to control the compressor 21 in the air brake system 20 that is associated with this compressor-controlling function unit 10.

Next, differences are described with reference to FIG. 7 between the control operation for compression by the conventional compressor and the control operation by the train-information management device according to the present embodiment.

FIG. 7 illustrates an example of variations in the amount of residual air in the air tank 23 provided in the air brake system 20. In FIG. 7, variations in the amount of residual air controlled by the train-information management device according to the present embodiment (the above control following FIG. 6) are illustrated by a solid line; and variations in the amount of residual air due to the conventional control are illustrated by a broken line. The section illustrated by hatched lines is a section where the regeneration is likely to be lost when controlled by the conventional technique.

During the conventional control operation, regardless of the location where the concerned train is running or the operating condition of a motor, when the amount of residual air (the residual amount in an air tank provided in an air brake system) reaches 0%, the operation of a compressor is started and is continued until the amount of residual air reaches 100%. After the amount of residual air reaches 100%, the compressor is stopped, and the compressor is not operated until the amount of residual air reaches 0% again.

In the control operation executed by the train-information management device according to the present embodiment, in the normal condition (the condition that is neither the regeneration-preparation condition nor the regenerating condition, i.e., the "normal" section in FIG. 7), when the amount of residual air reaches 20%, the operation of the compressor is started and is continued until the amount of residual air reaches 80%. After the amount of residual air reaches 80% and thus the compressor is stopped, the compressor is not operated until the amount of residual air reaches 20% again. In the regeneration-preparation condition (the "preparing" section in FIG. 7), when the amount of residual air reaches 0%, the operation of the compressor is started, and is continued until the amount of residual air reaches 80%. After the amount of residual air reaches 80% and thus the compressor is stopped, the compressor is not operated until the amount of residual air reaches 0% again. In the regenerating condition (the "regenerating" section in FIG. 7), when the amount of residual air is less than 100%, the compressor is operated. In a case where the regeneration-preparation condition is changed into the regenerating condition, when the amount of residual air is less than 100% and the compressor is being stopped, then the compressor is immediately operated.

As described above, in the control operation of the conventional technique, even in the regenerating condition (the condition where a regenerative brake is used) and even in a condition where the amount of residual air is less than 100%, the compressor is still not operated until the amount of residual air reaches 0%. In the control operation according to the present embodiment, however, in the regenerating condition, the compressor is operated without waiting for the amount of residual air to reach 0% so as to increase the power consumption in the train. Therefore, in the control operation according to the present embodiment, regenerated power generated by using the regenerative brake can be efficiently used. Further, because a larger amount of electric power is consumed by the train provided therewith, the loss of regeneration is likely not to occur. As illustrated in FIG. 7, in the conventional control operation, even in the regenerating condition, the compressor is still not operated until the amount of residual air reaches 0%. Therefore, loss of regeneration is more likely to occur (there are many sections, in which the regeneration losses are likely to occur, i.e., the power consumption of the train provided is low).

When the control according to the present embodiment is applied, during the regeneration-preparation condition, the compressor is not operated until the amount of residual air reaches 0%. Therefore, in the subsequent regenerating condition, the compressor can be driven for a longer duration, and accordingly a larger amount of regenerated power can be used in the train.

In the invention described in Patent Literature 1 described above, when the pressure in the main air reservoir (the air tank) is lower than an appropriate value, the compressor is set to be operated by regenerated power. However, the amount of residual air is not controlled in such a manner as to be maintained at 80% or less in the normal condition and in the regeneration-preparation condition as done in the present embodiment. Therefore, a case is assumed to occur in which at the time of generating regenerated power, the pressure in the air tank has reached an appropriate value or a value close to the appropriate value. That is, it is difficult for the invention described in Patent Literature 1 to use regenerated power as efficiently as the control applied with the present embodiment, and to prevent the occurrence of regeneration loss.

As described above, when a train is running through a section in which the train is less likely to use the regenerative brake (in the normal condition), the train-information management device according to the present embodiment controls the compressor that delivers compressed air to the air tank in the air brake system, such that the amount of residual air in the air tank falls within a given range (between 20% and 80%). Also, when the train approaches a section in which a train is more likely to use the regenerative brake, the train-information management device does not operate the compressor until the amount of residual air in the air tank reaches 0% in the regeneration-preparation condition. Thereafter, in a condition where the regenerative brake is used and power generation is performed by the motor (the regenerating condition), the train-information management device operates the compressor. In this manner, the amount of electric power (regenerated power) used, generated when using the regenerative brake, is increased in the train as compared to the conventional control, and therefore the amount of electric power to be returned to an overhead wire can be reduced. As a result, the occurrence of the loss of regeneration can be reduced in a case such as when other trains running in the vicinity and the like need only a small amount of electric power, and thus effective use of regenerated power can be achieved.

In the present embodiment, a case is described where a plurality (six) of vehicles constitute one train formation. However, the number of vehicles that constitute one formation can be more than 6 or less than 6. The formation can be constituted with a single vehicle.

INDUSTRIAL APPLICABILITY

As described above, the train-information management device according to the present invention is useful for achieving a more economical electric railway system that is capable of effectively using regenerated power.

REFERENCE SIGNS LIST 1 central device, 2-1 to 2-4 terminal device, 3-1 to 3-3, 3-5 to 3-8 device, 3-4 master controller, 3-9 VVVF, 3-10 brake device, 4 trunk transmission path, 5 branch transmission path, 6 power conversion device (VVVF), motor, 8 auxiliary power-supply device, 9 auxiliary device, 10 compressor-controlling function unit, 11 position detection unit, 12 compressor control unit, 13 regenerating-condition detection unit, 14 train-line-information holding unit, 15 residual-air-amount calculation unit, 20 air brake system, 21 compressor, 22 brake control unit (BCU), 23 air tank (main air reservoir), relay valve, 25 brake cylinder, 26 brake shoe.

The invention claimed is:

1. A train-information management device that is provided on a train, that manages information on devices provided in a vehicle, and that controls each of the devices, the train-information management device comprising:
   a position detection unit that detects a position of the train;
   a regenerating-condition detection unit that detects whether the train is in a condition of using a regenerative brake;
   a train-line-information holding unit that holds therein information on a section in which a train is more likely to use a brake;
   a residual-air-amount calculation unit that calculates an amount of residual air in an air tank that stores compressed air therein to be used for an air brake; and
   a compressor control unit that controls a compressor that generates the compressed air on the basis of a detection result obtained by the position detection unit, a detection result obtained by the regenerating-condition detection unit, information held in the train-line-information holding unit, and a calculation result obtained by the residual-air-amount calculation unit, wherein
   in a regeneration-preparation condition
      where a train is running through a position at which a distance between the position and a section in which a train is more likely to use a brake is equal to or less than a given value and is running toward the section, and
      where a train does not use a regenerative brake when the amount of residual air reaches 0%,
   the compressor control unit causes the compressor to start generating compressed air,
   in a regenerating condition where the train uses a regenerative brake, when the amount of residual air is less than 100%, the compressor control unit causes the compressor to generate compressed air, and
   in a normal condition that corresponds neither to the regeneration-preparation condition nor to the regenerating condition, when the amount of residual air reaches a first threshold value that is greater than 0%, the compressor control unit causes the compressor to start generating compressed air, and when the amount of residual air reaches a second threshold value that is greater than the first threshold value and less than 100%, the compressor control unit causes the compressor to finish generating compressed air.

2. The train-information management device according to claim 1, wherein in a case where the compressor control unit causes the compressor to generate compressed air in the regeneration-preparation condition, when the amount of residual air reaches a third threshold value that is less than 100%, the compressor control unit causes the compressor to finish generating compressed air.

3. A device control method in a train-information management device that is provided on a train, that manages information on devices provided in a vehicle, and that controls each of the devices, the device control method comprising:
   a condition determining of determining, on the basis of a position of the train, a usage status of a regenerative brake, and information on a section in which a train is more likely to use a brake, which of
      a regeneration-preparation condition in which the train is running through a position at which distance between the position and a section in which the train is more likely to use a brake is equal to or less than a given value, is running toward the section, and does not use a regenerative brake,
      a regenerating condition in which the train uses a regenerative brake, and
      a normal condition that corresponds neither to the regeneration-preparation condition nor to the regenerating condition,
   the train is in;
   a first controlling of causing a compressor that generates the compressed air to start generating compressed air when an amount of residual air in an air tank that stores compressed air therein to be used for an air brake reaches 0% in a case where the train is in the regeneration-preparation condition;
   a second controlling of causing the compressor to generate compressed air when the amount of residual air is less than 100% in a case where the train is in the regenerating condition; and
   a third controlling of, in a case where the train is in the normal condition,
      causing the compressor to start generating compressed air when the amount of residual air reaches a first threshold value that is greater than 0%, and
      causing the compressor to finish generating compressed air when the amount of residual air reaches a second threshold value that is greater than the first threshold value and less than 100%.

4. The device control method according to claim 3, wherein at the first controlling,
   in a case where the compressor control unit causes the compressor to generate compressed air, when the amount of residual air reaches a third threshold value that is less than 100%, the compressor control unit causes the compressor to finish generating compressed air.

* * * * *